3,503,791
PROCESS OF FORMING AN ALUMINO-SILICIDE LAYER ON A METAL PART
Marcel Armand, Michel Charveriat, and Michel Salmon, Albertville, France, assignors to Societe d'Electro-Chimie, d'Electro-Metallurgie et des Acieries Electriques d'Ugine, Paris, France
No Drawing. Filed Aug. 23, 1966, Ser. No. 574,312
Claims priority, application France, Aug. 30, 1965, 29,795
Int. Cl. C23f 7/00; C23c 1/00
U.S. Cl. 117—114         9 Claims

ABSTRACT OF THE DISCLOSURE

A process is provided for coating a part which is formed from one of the metals zirconium, titanium, hafnium, niobium, tantalum, vanadium or alloys thereof by forming a layer of an alumino-silicide of said metal on the part. The process includes immersing the part in a liquid bath which is maintained at a temperature between 575 and 1000° C. The bath is composed of aluminum, 1 to 40% by weight silicon and a sufficient quantity of said metal such that the bath is in equilibrium with a solid phase having a composition corresponding to the layer which is deposited.

---

This invention relates to the protection of metals such as zirconium, titanium, hafnium, niobium, tantalum, vanadium and the alloys formed by these metals either with each other or with other metals.

It is well known that the above-mentioned metals are capable of absorbing different interstitial elements and in particular hydrogen, oxygen and nitrogen under the action of different agents including these elements in a state of high purity, mixtures of said elements or some of their compounds such as, for example, water vapor, the hydrocarbons and the oxides of carbon.

The absorption process referred to above can begin at temperatures which are slightly higher than room temperature and takes place at a higher rate the higher the temperature. There is first observed the formation of an insertion solid solution and then the formation of definite compounds of brittle structure. These phenomena are accompanied by appreciable modifications in the properties of the metal and, in particular, by substantial swelling which is followed within a fairly short time by disaggregation or breakaway of metal or alloy. Thus, a sheet of zirconium or titanium 2 mm. in thickness is completely destroyed in a few hours as a result of heating to 400° C. in high purity hydrogen at a pressure of 500 torr. In 15 minutes, a hafnium specimen which is contacted with hydrogen at a pressure of 500 torr at 500° C. absorbs 375 mg. of hydrogen per $dm.^2$, under the same conditions, a specimen of niobium absorbs 100 $mg./dm.^2$.

In many instances, the solubility of interstitial elements is high at high temperature and lower when cold. As a consequence, a metal which is charged with interstitial elements can have properties in the hot state which are only slightly different from those of the pure metal inasmuch as the interstitial element is in this case dissolved and is liable to be embrittled in the cold state as a result of the formation of definite compounds. This is especially the case with hydrogen.

Again in the case of hydrogen, the absorption process can take place in contact with gaseous molecular hydrogen as well as with hydrogenated compounds which are capable of decomposing under utilization conditions by liberating hydrogen, either as a result of chemical reaction in contact with the metal as is the case with hot water or water vapor, or as a result of pyrolysis under the action of heat, or else as a result of radiolysis under the action of radiation of particles produced during operation of nuclear reactors. Particularly intense processes of hydrogen absorption have also been observed starting from room temperature when the metals considered performed the function of a cathode in an electrochemical process.

The absorption of oxygen or nitrogen by the metals considered also takes place in a very short time according to known laws.

The possibility of creating a barrier to the penetration of interstitial elements has been examined by different research scientists. Accordingly, it has been proposed to coat the metals considered with a layer of metal having an aluminum base and constituted by aluminum of high purity or in some instances by a silicon-aluminum alloy containing a high proportion of aluminum. In the cold state and at moderate temperatures, the above-mentioned layer constitutes an excellent barrier to the penetration of interstitial elements, in all probability by virtue of the aluminum oxide film which forms spontaneously at its surface. However, in the hot state, an intermetallic diffusion process usually takes place between the aluminum and the metals considered and tends to form thick, brittle and often non-continuous layers of intermetallic compounds to the detriment of the layer of aluminum and the coated metal. As a result of this diffusion process, voids frequently appear at the interface of the two metals and finally result in breakaway of the protective layer. This intermetallic diffusion process takes place at temperatures which depend on the nature of the metal to be protected, and is more extensive as the temperature is higher. For example, in the case of zirconium-aluminum bonds, diffusion already occurs at an appreciable rate at and above 400° C. and proceeds at a high rate above 500 or 600° C. Consequently, the metals which are coated in this maner with a layer of aluminum or a binary alloy of aluminum can be employed only at relatively low temperatures. At higher temperatures at which the properties of such metals would be even more highly valued, the layer of intermetallic compounds would form during use, would frequently be porous and non-continuous, and the base metal would consequently be exposed to the action of interstitial elements without any protection against this action.

Finally, the hot-state intermetallic diffusion referred to makes it impracticable to coat the majority of these metals with a layer of aluminum by dipping the part in liquid aluminum by reason of the fact that, during this operation, the rate of dissolution of metal to be coated is too high. The dipped part would in fact be well coated with an aluminum laver upon removal from the bath but its dimensions would be modified in a variable manner from one operation to another, with the result that the part thus treated would prove unserviceable in many applications for which it might otherwise be intended.

The present invention makes it possible to circumvent the disadvantages noted in the foregoing. Accordingly, the invention mainly consists of a process for the protection of metal parts and especially parts of zirconium, titanium, hafnium, niobium, tantalum, vanadium and the alloys formed by these metals either with each other or with other metals against the penetration of interstitial elements, characterized in that the part to be protected is coated with a thin continuous layer of small grains of alumino-silicide of the metal considered by emmersing the part of a temperature comprised between 575° C. and 1000° C. in a liquid bath composed of aluminum, 1 to 40% silicon, and a quantity of said metal such that said liquid bath is in equilibrium with a solid phase, the composition of which corresponds to that of the protective layer which it is desired to deposit.

The expression "alumino-silicide of the metal considered" as employed in the foregoing is understood to refer in this context to the intermetallic compounds which have a well-defined crystal lattice but the exact composition of which depends on the metal which is combined with the aluminum and silicon, on the proportion of aluminum and silicon in the bath and on the temperature at which the operation is performed in accordance with the phase diagram Al/Si/Me.

For example, in the case of zirconium and of a weight ratio Si/Al+Si in the bath which can range from 2 to 12%, the proportion of alumino-silicide which is deposited when the tempehature of the bath is higher than 660° C. is set within the following limits:

Structure of $Zr_2Al_5Si$ type:

| | Percent |
|---|---|
| Al | 48.5 to 38 |
| Si | 3.5 to 10 |
| Zr | 48 to 53 |

Again in the case of zirconium and of a weight ratio Si/Al+Si in the bath which is higher than 12%, there is deposited at a temperature of above 725° C. an alumino-silicide having a composition by weight within the following limits:

Structure of $ZrSi_2$ type:

| | Percent |
|---|---|
| Al | 4 to 20 |
| Si | 28 to 38 |
| Zr | 50 to 62 |

The barrier in accordance with the invention is effective up to relatively high temperatures, both for ensuring protection against interstitial elements and for inhibiting intermetallic diffusion with aluminum. However, so far as concerns effective imperviousness to interstitial elements, it is preferable to protect the alumino-silicide barrier in accordance with the invention with a layer containing aluminum. In any case, this layer is usually present in the form of a thin film of bath metal which adheres to the part and solidifies at the time of withdrawal from the dipping tank. The metal layer containing aluminum has the same composition as the bath, that is to say a composition which is different from that of the alumino-silicide in accordance with the invention.

In accordance with an alternative embodiment of the invention, it is possible to shield the barrier against interstitial elements by overlaying or cladding with a thin auminum foil. In order to apply such a foil, it is possible to make use of the film of bath metal which remains on the part after formation of the barrier. During the overlaying of an aluminum foil at moderate temperature which is preferably in the range 575° C. to 660° C., the said film of bath metal performs the function of a brazing agent.

The coating materials in accordance with the invention have proved to be perfectly stable when subjected to prolonged heat treatments at high temperatures, for example up to 550° C. In particular, the coating of intermetallic compounds constitutes an effective barrier to the diffusion of aluminum at the time of utilization in the hot state of a part which is coated with aluminum.

Finally, the barrier in accordance with the invention prevents the penetration of interstitial elements into the metal on which it forms a coating.

An explanatory illustration of the invention will now be given by means of the non-limitative examples which now follow.

EXAMPLE 1

Use was made of a zirconium alloy of nuclear grade containing:

| | Percent |
|---|---|
| Sn | 1.5 |
| Fe | 0.12 |
| Cr | 0.10 |
| Ni | 0.05 |

A tube fabricated of this alloy and having the following dimensions:

| | Mm. |
|---|---|
| Length | 300 |
| External diameter | 107 |
| Thickness | 3 | was immersed for a period of ten minutes in a metal bath which was heated to 950° C. and which had the following composition by weight:

| | Percent |
|---|---|
| Al | 85.5 |
| Si | 12 |
| Zr | 2.5 | in contact with a solid phase having the following composition by weight:

| | Percent |
|---|---|
| Si | 10 |
| Zr | 50 |
| Al | 40 |

The tube was coated both internally and externally with a continuous barrier which was formed of an intermetallic compound with a structure of the type $Zr_2Al_5Si$ and had a thickness of approximately $20\mu$. After removal from the bath and cooling, this barrier was in turn coated with a thin film of ternary alloy having the same composition as the bath.

The tube which was thus treated was then subjected to the two following tests:

(1) Continuous heating in a vacuum for a period of 1000 hours and at a temperature of 500° C. No appreciable modification was observed in the structure of the two layers.

(2) Continuous heating in high-purity hydrogen over a period of 300 hours, at a temperature of 400° C. and a pressure of 500 torr. The proportion of hydrogen absorbed by the metal was below measurable values.

EXAMPLE 2

A strip measuring 30 x 100 x 1 mm. of the same alloy as that used in Example 1 was immersed for a period of twenty minutes at 750° C. in a bath having the following composition by weight:

| | Percent |
|---|---|
| Al | 88.3 |
| Si | 10.9 |
| Zr | 0.8 | in the presence of crystals of an intermetallic compound with a structure of the $Zr_2Al_5Si$ type.

There was formed on the strip a continuous layer having a thickness of approximately $20\mu$ and constituted by small grains of the type $Zr_2Al_5Si$. Upon removal from the bath, the strip was covered with a thin film which had the same composition as the bath.

The part thus obtained was subjected to a treatment in air at 1000° C. for a period of two hours. A weight gain of only 33 mg./dm.$^2$ was noted.

By way of comparison, an identical strip which was not coated in accordance with the invention and which was subjected to heating in air at 1000° C. over a two-hour period exhibited a weight gain of 530 mg./dm.²

EXAMPLE 3

A strip measuring 20 x 30 x 1 mm. of high-purity titanium was immersed for a period of fifteen minutes at 840° C. in a liquid bath of aluminum alloy containing 9% silicon and 2% titanium, said bath being in contact with a ternary solid compound Al/Si/Ti.

There was formed on said strip a thin protective layer of titanium alumino-silicide, the thickness of which was approximately 11μ.

When placed for a period of 50 hours in an atmosphere of high-purity hydrogen at a temperature 500° C. and a pressure of 500 torr in a thermobalance, said strip showed a weight gain of less than 1.5 mg./dm.²

The strip was then subjected to three rapid thermal cycles each comprising a cooling stage of 500° C. to 50° C. in 18 minutes followed by a temperature rise to 500° C. in 9 minutes. Resistance of the strip to hydrogen penetration was maintained.

By way of comparison, a titanium strip which was not provided with the coating in accordance with the invention and placed under the same conditions in a hydrogen atmosphere showed a weight gain of 95 mg./dm.² over a period of only 50 minutes.

EXAMPLE 4

A strip of hafnium measuring 31 x 10 x 0.5 mm. was immersed for a period of four minutes at 687° C. in a liquid bath composed of an alumnum alloy containing 10% silicon and 2.5% hafnium. This bath was in contact with a ternary solid compound Al/Si/Hf.

The part thus treated received a coating of hafnium alumino-silicide having thickness of 6μ.

After removal from the bath, said strip was placed for a period of 50 hours in a hydrogen atmosphere at a temperature of 500° C. and a pressure of 500 torr. The weight gain of the strip was only 1.7 mg./dm.².

By way of comparison, a hafnium strip which was not provided with a coating in accordance with the invention exhibited a weight gain of 375 mg./dm.² in only 15 minutes.

EXAMPLE 5

A strip of niobium measuring 14.5 x 21 x 1 mm. was immersed for a period of 30 minutes at 820° C. in a liquid bath composed of an aluminum alloy containing 8.9% silicon and 2.2% niobium. This bath was in contact with a ternary solid compound Al/Si/Nb.

A layer of niobium aluminum-silicide 61μ in thickness was formed on the part thus treated.

The part was then subjected for a period of 50 hours to the action of high-purity hydrogen at a temperature of 500° C. and a pressure of 500 torr. The weight gain observed was less than 3.2 mg./dm.².

The part was then subjected to three rapid thermal cycles as defined in Example 3. Its resistance to hydrogen penetration was in no way reduced in consequence.

By way of comparison, a niobium strip which was not coated in accordance with the process of the invention and placed under the same conditions of hydrogen atmosphere exhibited a weight gain of 120 mg./dm.² over a period of only 25 minutes.

EXAMPLE 6

A strip of high-purity tantalum measuring 20.1 x 15 x 0.9 mm. was immersed for a period of 8 minutes at 840° C. in a liquid bath composed of an aluminum alloy containing 9% silicon and 3% tantalum. This bath was in contact with a ternary solid compound Al/Si/Ta.

A coating of tantalum alumino-silicide having a thickness of 3μ was formed on the strip.

No weight gain was noted after this strip had been subjected to the action of high-purity hydrogen over a period of 50 hours at a temperature of 500° C. and a pressure of 500 torr.

The part was subjected to three rapid thermal cycles as defined in Example 3. Its resistance to hydrogen penetration was undiminished.

By way of comparison, a tantalum strip which was not coated in accordance with the invention and placed under the same conditions in a hydrogen atmosphere showed a weight gain of 10 mg./dm.² over a period of only 25 minutes.

What we claim is:

1. A process for coating a part, said part being formed from zirconium, titanium, hafnium, niobium, tantalum or vanadium metal or alloys thereof, by forming a layer of an alumino-silicide of said metal on said part, said process comprising immersing said part in a liquid bath maintained at a temperature between 575 and 1000° C., said bath being composed of aluminum, 1 to 40% by weight silicon and a sufficient quantity of said metal such that said bath is in equilibrium with a solid phase, said solid phase having a composition corresponding to said layer and forming said layer on said part.

2. The process of claim 1 wherein the metal is zirconium, the bath is maintained at a temperature above 660° C. and the weight ratio of silicon to aluminum plus silicon in the bath is between 2 and 12%.

3. The process of claim 1 wherein the metal is zirconium, the bath is maintained at a temperature above 725° C. and the weight ratio of silicon to aluminum plus silicon in the bath is higher than about 12%.

4. The process of claim 1 wherein the alloy is a zirconium alloy composed of, by weight, 1.5% tin, 0.12% iron, 0.10% chromium, 0.05% nickel and balance zirconium, the bath is maintained at a temperature of about 950° C. and the bath is composed of, on a weight basis, about 85.5% aluminum, 12% silicon and 2.5% zirconium.

5. The process of claim 1 wherein the alloy is a zirconium alloy composed of, by weight, 1.5% tin, 0.12% iron, 0.10% chromium, 0.05% nickel and balance zirconium, the bath is maintained at a temperature of about 750° C. and the bath is composed of, on a weight basis, about 88.3% aluminum, 10.9% silicon and 0.8% zirconium.

6. The process of claim 1 wherein the metal is titanium, the bath is maintained at a temperature of about 840° C. and the bath is composed of, on a weight basis, about 89% aluminum, 9% silicon and 2% titanium.

7. The process of claim 1 wherein the metal is hafnium, the bath is maintained at a temperature of about 687° C. and the bath is composed of, on a weight basis, about 87.5% aluminum, 10% silicon and 2.5% hafnium.

8. The process of claim 1 wherein the metal is niobium, the bath is maintained at a temperature of about 820° C. and the bath is composed of, on a weight basis, about 88.9% aluminum, 8.9% silicon and 2.2% niobium.

9. The process of claim 1 wherein the metal is tantalum, the bath is maintained at a temperature of about 840° C. and the bath is composed of, on a weight basis, about 88% aluminum, 9% silicon and 3% tantalum.

References Cited

UNITED STATES PATENTS

| | | |
|---|---|---|
| 3,078,554 | 2/1963 | Carlson. |
| 3,168,380 | 2/1965 | Bradley et al. ____ 117—114 X |
| 3,184,292 | 5/1965 | Argyriades et al. __ 117—114 X |

ALFRED L. LEAVITT, Primary Examiner

J. R. BATTEN, JR., Assistant Examiner

U.S. Cl. X.R.

29—194; 117—71, 131, 135.1